United States Patent
Poulain et al.

(10) Patent No.: US 10,321,205 B2
(45) Date of Patent: Jun. 11, 2019

(54) METHOD FOR BROADCASTING AN ALERT SERVICE

(71) Applicant: ENENSYS TECHNOLOGIES, Cesson Sevigne (FR)

(72) Inventors: Ludovic Poulain, Cesson Sevigne (FR); Laurent Roul, Cesson Sevigne (FR)

(73) Assignee: ENENSYS TECHNOLOGIES, Cesson Sevigne (FR)

( * ) Notice: Subject to any disclaimer, the term of this patent is extended or adjusted under 35 U.S.C. 154(b) by 171 days.

(21) Appl. No.: 15/327,414

(22) PCT Filed: Jul. 30, 2015

(86) PCT No.: PCT/EP2015/067597
§ 371 (c)(1),
(2) Date: Jan. 19, 2017

(87) PCT Pub. No.: WO2016/016403
PCT Pub. Date: Feb. 4, 2016

(65) Prior Publication Data
US 2017/0188117 A1    Jun. 29, 2017

(30) Foreign Application Priority Data
Jul. 31, 2014   (FR) ...................................... 14 57435

(51) Int. Cl.
*H04N 21/81*      (2011.01)
*H04N 21/236*     (2011.01)
*H04N 21/61*      (2011.01)

(52) U.S. Cl.
CPC ..... *H04N 21/814* (2013.01); *H04N 21/23608* (2013.01); *H04N 21/23611* (2013.01); *H04N 21/6112* (2013.01)

(58) Field of Classification Search
CPC ........................ H04N 21/23608; H04N 21/814
See application file for complete search history.

(56) References Cited

U.S. PATENT DOCUMENTS

| 5,917,830 A | * | 6/1999 | Chen | H04N 7/165 |
| | | | | 348/473 |
| 2006/0020964 A1 | * | 1/2006 | Yun | H04N 7/08 |
| | | | | 725/33 |

(Continued)

FOREIGN PATENT DOCUMENTS

| EP | 1 619 895 A2 | 1/2006 | |
| FR | 2963864 A1 * | 2/2012 | .............. H04H 20/18 |

(Continued)

OTHER PUBLICATIONS

Oct. 15, 2015 Search Report issued in International Patent Application No. PCT/EP2015/067597.

*Primary Examiner* — Junior O Mendoza
(74) *Attorney, Agent, or Firm* — Oliff PLC; R. Brian Drozd

(57) ABSTRACT

A method for broadcasting an alert service in a system for broadcasting digital audiovisual programs in a single-frequency network, wherein the method includes steps of: obtaining frames containing the alert service and other services; associating a mark for each frame; identifying the identifiers of the packets of audio and video components of the alert service and of other services; identifying the identifiers of packets of audio and video components of other services; receiving a command to broadcast an alert message; storing video and audio packets of the alert service as from the first frame mark following the reception of the alert message broadcast command; and replacing, from the second frame mark following the reception of the alert message broadcast command, all the packets of the video and audio components of the services other than the alert service with the packets of the alert service.

7 Claims, 7 Drawing Sheets

(56) References Cited

U.S. PATENT DOCUMENTS

| | | | |
|---|---|---|---|
| 2006/0130119 A1* | 6/2006 | Candelore | H04N 7/163 |
| | | | 725/135 |
| 2008/0022318 A1 | 1/2008 | Yoshino et al. | |
| 2009/0100457 A1 | 4/2009 | Lee et al. | |
| 2009/0228916 A1* | 9/2009 | Kim | H04N 7/08 |
| | | | 725/33 |
| 2012/0030703 A1* | 2/2012 | Strong | H04H 20/59 |
| | | | 725/33 |
| 2013/0215328 A1* | 8/2013 | Lhermitte | H04H 20/18 |
| | | | 348/500 |
| 2014/0282704 A1* | 9/2014 | Tumuluru | H04N 21/4882 |
| | | | 725/33 |

FOREIGN PATENT DOCUMENTS

| | | |
|---|---|---|
| WO | 2012/019889 A1 | 2/2012 |
| WO | 2014/090928 A1 | 6/2014 |

* cited by examiner

METHOD FOR BROADCASTING AN ALERT SERVICE

The present invention relates to the field of the broadcasting of an alert service in a system for broadcasting digital audiovisual programmes in a single-frequency network.

In systems for broadcasting digital audiovisual programmes the audiovisual streams are multiplexed and marked timewise to allow SFN (Single Frequency Network) broadcasting thereof.

SFN (Single Frequency Network) broadcasting is characterised in that the broadcasting of the services is done by the sending of the data stream by various transmitters on a single modulation frequency. Because of this, it is necessary for these various transmitters to receive exactly the same content and to be finely synchronised together in order to avoid causing interference in the places situated at the junction of the coverage areas of the various transmitters.

This synchronisation between the various SFN transmitters can for example be achieved by inserting, in the stream distributed to these transmitters, synchronisation packets such as T2-MI (T2-Modulator Interface) timestamp packets that correspond, in the DVB-T2 standard, to timestamps, and MIPs (Mega-frame Initialisation Packets) in the DVB-H and DVB-T standards. This mechanism is described in the document: "Digital Video Broadcasting (DVB); DVB mega-frame for Single Frequency Network (SFN) synchronization modulator interface (T2-MI) for a second generation digital terrestrial television broadcasting system (DVB-T2)" of the ETSI (*European Telecommunications Standards Institute*) under the reference ETSI TS 102 773 V1.1.1 (2009-09). The transmission point receiving the stream then synchronises on the received stream, for example by means of these T2-MI packets of the DVB-T2 timestamp type. This synchronisation of the transmission point on the received stream causing the synchronisation together of all the transmission points is referred to as the SFN synchronisation of the transmission point.

SFN broadcasting is characterised by the definition of SFN networks. An SFN network is a geographical area covered by a set of transmitters, the number of which is greater than or equal to one. These transmitters are finely synchronised and transmit exactly the same data stream on the same frequency.

In some regions, the population is subjected to major risks such as for example a volcanic eruption, hurricanes or typhoons. To enable such populations to take precautions before the arrival of such events, alert messages are broadcast by the authorities. The broadcasting of such alert messages by means of a system for broadcasting SFN digital audiovisual programmes is an advantageous solution but one that is difficult to implement because of the synchronisation of the various SFN transmitters and the multiplexing of the audiovisual streams.

The present invention aims to enable a system for broadcasting digital audiovisual programmes in a single-frequency network to broadcast an alert service in a way that is simple and rapid to implement and of low complexity.

The invention relates to a method for broadcasting an alert service in a system for broadcasting digital audiovisual programmes in a single-frequency network, characterised in that the method comprises the steps performed by an insertion module of the alert service:
  obtaining frames containing the alert service and other services,
  associating a mark for each frame,
  identifying the identifiers of the packets of audio and video components of the alert service,
  identifying the identifiers of the packets of audio and video components of other services,
  receiving a command to broadcast an alert message,
  storing video and audio packets of the alert service as from the first frame mark following the reception of the alert message broadcast command,
  replacing, as from the second frame mark following the reception of the alert message broadcast command, all the packets of the video and audio components of the services other than the alert service with the packets of the alert service stored in the backup memory and replacing the identifiers of packets of audio and video components of the alert service respectively with the identifiers of packets of the audio or video component of the packet replaced in order to form a new frame.

The invention also relates to a device for broadcasting an alert service in a system for broadcasting digital audiovisual programmes in a single-frequency network, characterised in that the device comprises:
  means for obtaining frames containing the alert service and other services,
  means for associating a mark for each frame,
  means for identifying the identifiers of the packets of audio and video components of the alert service,
  means for identifying the identifiers of the packets of audio and video components of other services,
  means for receiving a command to broadcast an alert message,
  means for storing video and audio packets of the alert service as from the first frame mark following the reception of the alert message broadcast command,
  means for replacing, as from the second frame mark following the reception of the alert message broadcast command, all the packets of the video and audio components of the services other than the alert service with the packets of the alert service stored in the backup memory and replacing the identifiers of packets of audio and video components of the alert service respectively with the identifiers of packets of the audio or video component of the packet replaced in order to form a new frame.

Thus the system for broadcasting digital audiovisual programmes in a single-frequency network can broadcast an alert service in a way that is simple and rapid and not complex to implement.

Indeed, the present invention is able to broadcast the alert service less than two frames after the reception of a command to broadcast an alert message.

According to a particular embodiment of the invention, replacing all the packets of the video and audio components of the services other than the alert service with packets of the alert service stored in the backup memory is broken down into substeps of:
  replacing, as from the second frame mark following the reception of the command to broadcast an alert message, all the packets of the video and audio components of the services other than the alert service with null packets,
  replacing the null packets with packets of the alert service stored in the backup memory.

Thus the packets of the alert service do not need to be stored as many times as there exist other services.

According to a particular embodiment of the invention, the frames are type T2 frames and the method further comprises the step of encapsulating the packets of the new frame in a T2-MI stream.

Thus the present invention is applicable in new-generation broadcasting systems.

According to a particular embodiment of the invention, the T2 frames comprising the alert service and the other services are included in at least one T2-MI stream and the T2 frames are obtained by de-encapsulating the T2 frames in the T2-MI stream.

Thus the present invention is applicable in new-generation broadcasting systems.

According to a particular embodiment of the invention, the T2 frames comprising the alert service and the other services are included in a single T2-MI stream.

Thus the architecture of the broadcasting system is simplified.

According to a particular embodiment of the invention, the T2 frames comprising the alert service and other services are included in two T2-MI streams, the frames of the alert service being encapsulated in a T2-MI stream different from the T2-MI stream in which the T2 frames comprising the other services, and the method comprises the step of aligning the frames of the alert service and the frames of the other services.

Thus, by encapsulating the frames of the alert service in another T2-MI stream, it is possible to have a generation of the alert service centralised, for example, by a body, such as a state, in parallel with the conventional broadcasting operators.

According to a particular embodiment of the invention, the T2 frames are included in the TS streams and the method further comprises the steps of:
- calculating the ratio between the number of packets of video and audio components of the alert service and the number of packets of video components of the alert service and other services,
- determining a timestamping for each TS stream.

Thus the new frames are in accordance with the standard used for the broadcasting.

According to a particular embodiment of the invention, the method further comprises the step of receiving a command to stop broadcasting an alert message and the packets of the other services are not replaced as from the mark of the frame following the reception of the command to stop broadcasting an alert message.

The features of the invention mentioned above, as well as others, will emerge more clearly from a reading of the following description of an example embodiment, said description being given in relation to the accompanying drawings, among which:

The present invention is described in a broadcasting system in accordance with the DVB-T2 standard, the acronym for Digital Video Broadcasting—Second Generation Terrestrial. The present invention is also applicable in audiovisual broadcasting systems in accordance with other broadcasting standards.

Figure 1:
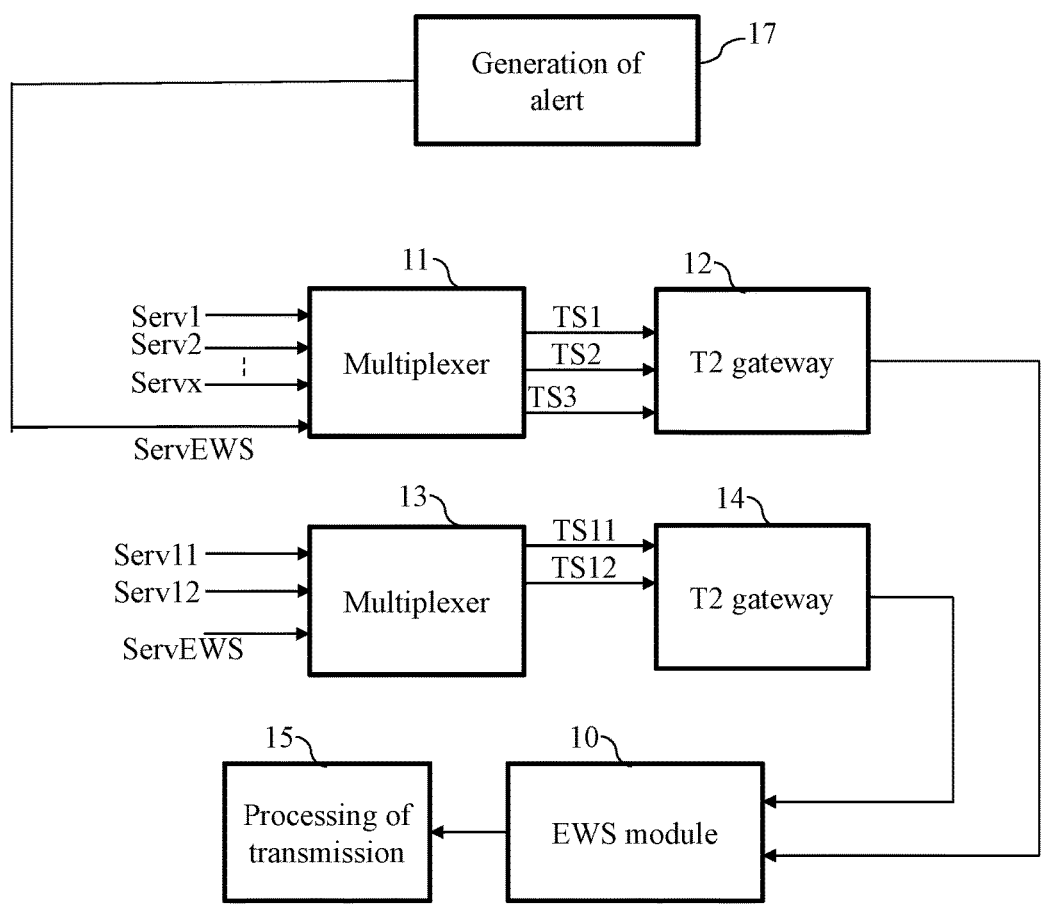
FIG. 1 illustrates an example of architecture for broadcasting an alert service in a system for broadcasting digital audiovisual programmes in a single-frequency network according to the present invention.

The system according to the example in FIG. 1 comprises at least one multiplexer 11 that multiplexes audiovisual services to be broadcast.

The multiplexer 11 encodes and multiplexes for example x services denoted Serv1 and Serv2 to Servx as well as a service denoted ServEWS, which comprises the audiovisual programme to be broadcast in the event of an alert.

In a variant, the system comprises a second multiplexer 13 that multiplexes at least the audiovisual alert service to be broadcast ServEWS in place of the multiplexer 11.

The multiplexer 11 forms for example three audiovisual data streams denoted TS1, TS2 and TS3. The audiovisual data streams TS1, TS2 and TS3 are streams of the TS (the acronym for Transport Stream) type in accordance with ISO 13818.

According to the variant, the multiplexer 13 encodes and multiplexes for example the services denoted Serv11, Serv12, and ServEWS The multiplexer 13 forms for example two audiovisual data streams denoted TS11 and TS12. The audiovisual data streams TS11 and TS12 are type TS streams.

The data streams formed by the multiplexer 11 are processed by a T2 gateway denoted 12 in accordance with the DVB standard in version 2 thereof and which forms a stream called a T2-MI stream. A T2-MI stream consists of a set of isolated physical-layer tunnels. Each tunnel contains a multiplex of programmes corresponding to a TS stream within the meaning of version 1 of the standard. The T2-MI stream is therefore composed of various programmes that are to be broadcast over a given region and of the alert service. The T2-MI stream formed by the T2 gateway 12 is hereinafter referred to as the main T2-MI stream. This T2-MI stream comprises the services broadcast when no command for broadcasting the alert service is generated as well as the alert service that is not broadcast when a command to broadcast the alert service is not generated.

According to the variant, the data streams formed by the multiplexer 13 are processed by a T2 gateway denoted 14 also in accordance with the DVB standard in version 2 thereof and which forms a T2-MI stream. The T2-MI stream formed by the T2 gateway 14 is hereinafter referred to as the secondary T2-MI stream.

The T2-MI stream or streams formed by the T2 gateway 12 or even the T2 gateway 14 are transferred, in accordance with the present invention, to an EWS alert service insertion module denoted 10.

The transfer of the T2-MI stream or streams formed by the T2 gateway 12 or even the T2 gateway 14 is done by means of a satellite link. Satellite broadcasting is only one example, any other broadcasting means being able to be used. Satellites offer the advantage of affording a wide coverage of a set of potentially numerous transmitters distant from one another. According to the territory to be covered, broadcasting by optical fibre can for example be envisaged.

An alert service generation module 17 generates commands to broadcast the alert stream to the alert service insertion module 10. The alert service generation module 17 is able to generate the service denoted ServEWS to the multiplexer 11 or 13 or not if the alert service is generated by another device not shown in FIG. 1.

According to the present invention the EWS alert service insertion module 10:
- obtains frames containing the alert service and other services,
- associates a mark for each frame,
- identifies identifiers of the packets of audio and video components of the alert service,
- identifies identifiers of the packets of audio and video components of the other services,
- receives a command to broadcast an alert message,
- stores video and audio packets of the alert service as from the first frame mark following the reception of the command to broadcast an alert message,
- replaces, as from the second frame mark following the reception of the command to broadcast an alert message, all the packets of video and audio components of the services other than the alert service with the packets of the alert service stored in the backup memory and replaces identifiers of packets of audio and video components of the alert service respectively with the identifiers of packets of the audio and video component of the packet replaced in order to form a new frame.

The EWS alert service broadcasting module 10 transfers the T2-MI stream thus formed to processing and transmission equipment for broadcasting 15.

It should be noted here that, for reasons of simplification, a single EWS alert service broadcasting module and a single item of processing and transmission equipment for broadcasting are shown in FIG. 1. In reality, the system comprises one EWS alert service broadcasting module 10 and one item of processing and transmission equipment for one broadcast 15 per SFM network.

Figure 2:
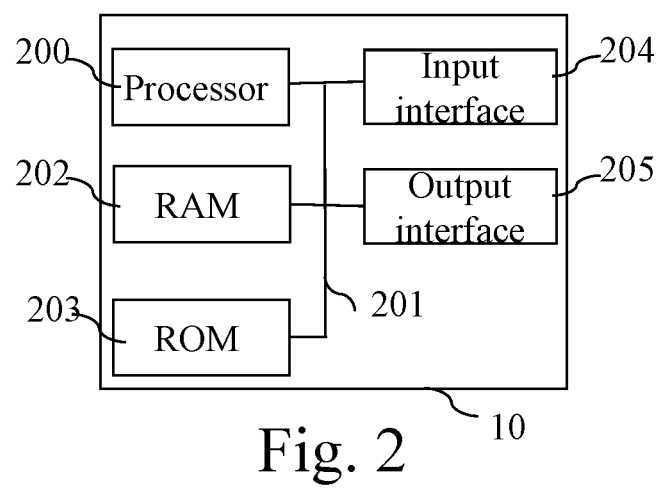
FIG. 2 shows a module for inserting an alert service for synchronous terrestrial broadcasting in a single-frequency network according to the present invention.

FIG. 2 shows an alert service insertion module for synchronous terrestrial broadcasting in a single-frequency network according to the present invention.

The alert service insertion module 10 comprises a communication bus 201 to which there are connected a processor 200, a non-volatile memory 203, a random access memory 202, an interface 204 for communicating or inputting with the T2 gateways 12 and 14 and an interface 205 for communicating or outputting with the processing and transmission module 15.

The non-volatile memory 203 stores the software modules implementing the invention, as well as the data for implementing the algorithm that will be described hereinafter with reference to FIG. 3.

In more general terms, the programs according to the present invention are stored in a storage means. This storage means can be read by the microprocessor 200.

When the alert service insertion module 10 is powered up, the software modules according to the present invention are transferred into the random access memory 202, which then contains the executable code of the invention as well as the data necessary for implementing the invention.

By means of the interface 205, the alert service insertion module 10 transfers the modified stream to the processing and transmission module 15 for broadcasting.

All or some of the steps of the algorithm described hereinafter with regard to FIG. 3 can be implemented by software by executing the steps by means of a programmable device such as a microprocessor, a DSP (Digital Signal Processor) or a microcontroller or implemented in a component such as an FPGA (Field-Programmable Gate Array) or an ASIC (Application-Specific Integrated Circuit).

In other words, the alert service insertion module 10 comprises the circuitry that enables the alert insertion module to execute the steps of the algorithm in FIG. 3.

FIG. 3 show an example of an algorithm for synchronous terrestrial broadcasting in a single-frequency network according to the present invention.

More precisely, the present invention is executed by the processor 200 of the alert service insertion module 10.

At step E300, the processor 200 detects the reception of the T2-MI streams from the T2 gateways 12 and 14 containing time markers for SFN broadcasting. The time markers are for example T2-MI-timestamp packets.

At step E301, the processor 200 aligns the T2-MI streams using the time information of the T2-MI-timestamp packets. For this purpose, the processor 200 determines, from information stored in the random access memory 202, the unique identifier of the alert service as well as the T2-MI stream that comprises the alert service. This information is for example and non-limitatively stored when the alert service insertion module 10 is installed.

When the alert service is included in the main T2-MI stream, the processor 200 does not execute step E301, the main T2-MI stream being already aligned.

When the alert service is included in the secondary T2-MI stream, the processor 200 executes step E301 and aligns the main T2-MI stream and the secondary T2-MI stream.

At the following step E302, the processor 200 de-encapsulates the T2-MI streams in order to supply TS streams. A T2-MI stream comprises T2-MI data packets such as T2-MI timestamp synchronisation packets, signalling packets, including the packet called current T2-MI L1, which gives information on the structure of the T2-MI stream, and packets referred to as baseband frame (or "BBframe") packets containing the data of the MPEG-2 TS streams in various tunnels. The T2-MI packets are organised in T2 frames; each T2 frame contains a T2-MI timestamp packet, a current T2-MI L1 packet and baseband frame packets.

It should be noted that in a variant the processor 200 can, instead of receiving T2-MI streams, receive directly TS streams with time markers corresponding to the standard used for the broadcasting. These markers are for example MIP packets (Megaframe Information Packets) in the case of first-generation DVB-T broadcasting.

In this case, the processor 200 does not execute steps E300 to E302.

At the following step E303, the processor 200 associates a mark for each T2 frame of each de-encapsulated TS stream.

Figure 4:
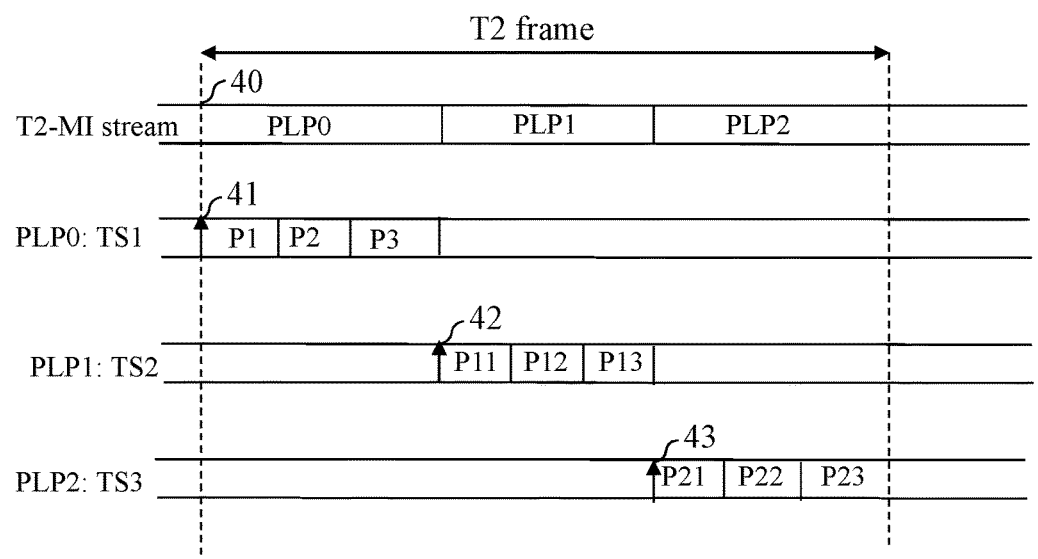
FIG. 4 shows an example of a T2-MI stream received and processed according to the present invention.

An example is given with reference to FIG. 4.

FIG. 4 shows an example of a T2-MI stream received and processed according to the present invention.

In the example in FIG. 4, a T2 frame of a T2-MI stream comprising three tunnels denoted PLP0, PLP1 and PLP2 is shown.

The tunnel PLP0 comprises data P1, P2 and P3 of the service Serv1 that have been multiplexed, the tunnel PLP1 comprises data P11, P12 and P13 of the service Serv2 that have been multiplexed and the tunnel PLP2 comprises data P21, P22 and P23 of the service Serv3 that have been multiplexed.

A mark 40, present in each frame T2, is duplicated to the first TS packet of each tunnel. The tunnel PLP0 is marked by the mark 41, the tunnel PLP1 is marked by the mark 42 and the tunnel PLP2 is marked by the mark 43.

At the following step E304, the processor 200 seeks, in the de-encapsulated T2-MI stream comprising the alert service, the unique identifier of the alert service and stores the PIDs (packet identifiers) of the video component and the audio component of the alert service. The identifier is called service_id.

At the following step E305, the processor 200 seeks, in the de-encapsulated T2-MI stream, the unique identifiers of the other services and stores the PIDs of the video component and audio components of the other services of the main stream.

Figure 3A:
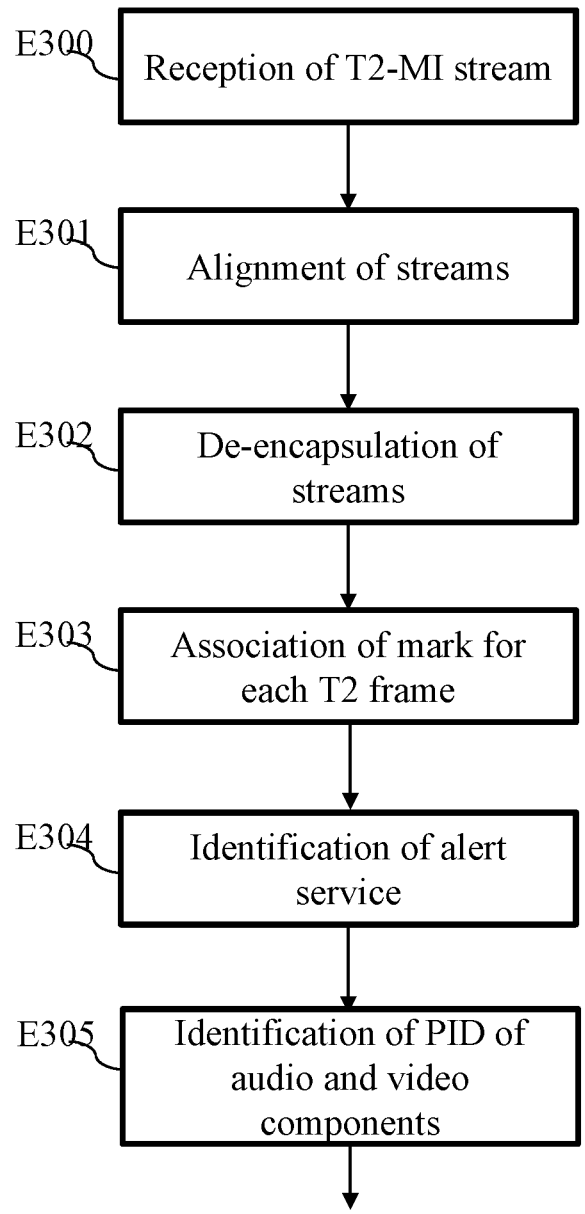
FIG. 3 show an example of an algorithm for synchronous terrestrial broadcasting in a single-frequency network according to the present invention.
Figure 3B:
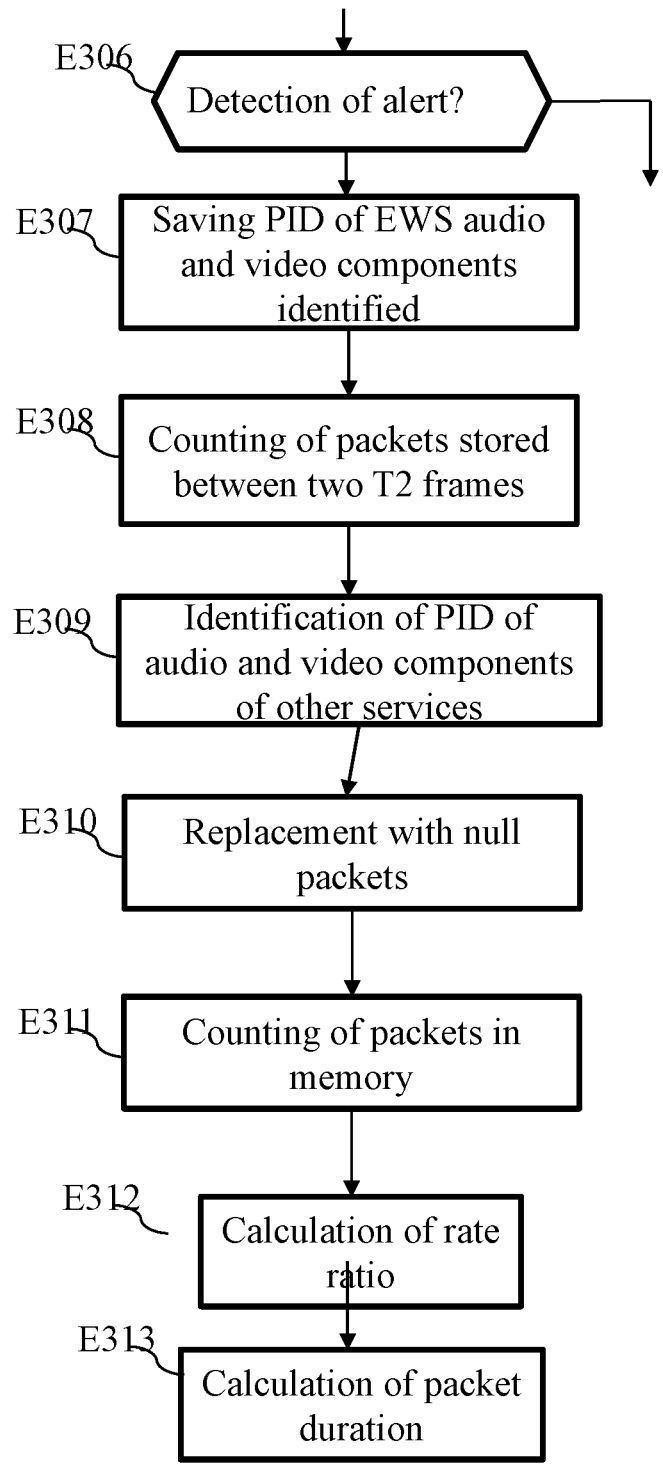

Once this operation has been performed, the processor 200 passes to step E306 of FIG. 3b.

At step E306, the processor 200 checks whether a command to broadcast an alert message is received.

The alert message broadcast command is for example included in one of the T2-MI streams received and is generated by the alert service generation module 17.

If no alert message broadcast command is received, no processing is carried out on the various TS streams. They are encapsulated in packets, keeping the same T2-MI structure as the T2-MI streams at the input of the alert service insertion module 10. Thus the BBframes have the same size and the T2-MI packets have the same counters.

If an alert message broadcast command is received, the processor 200 passes to step E307.

At step E307, the processor 200 stores the packets of the video component and audio components of the alert service as from the T2 frame mark following the reception of the alert message broadcast command. The other packets of the alert service are not saved.

Figure 5:
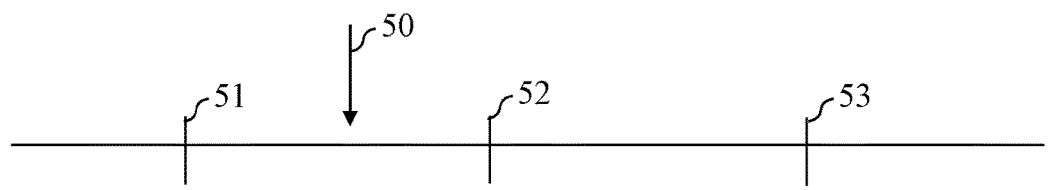
FIG. 5 shows the reception of a command to broadcast an alert message between T2 frames.

FIG. 5 shows the reception of an alert message broadcast command between T2 frames.

In the example in FIG. 5, an alert message 50 is received after the T2 frame mark denoted 51 and before the reception of the T2 frame mark 52.

The processor 200 at step 307 stores the packets of the video component and audio components of the alert service as from the T2 frame mark 52.

At the following step E308, the processor 200, for each frame T2, counts the number of TS packets stored at step E307. This number is called N°_packet_alert.

At the following step E309 and as from the following T2 frame mark, in the example in FIG. 5 the frame mark denoted 53, the processor 200 identifies the packets of the various TS streams contained in the main T2-MI stream.

At the following step E310, the processor 200 replaces all the PID packets of the video and audio components of the services other than the alert service with null packets.

At step E311, the processor 200, for each T2 frame of the main T2-MI stream, counts the number of TS packets in each of the TS streams of the main T2-MI stream. For each TS stream of the main T2-MI stream, this number is called N°_packet(i) where i identifies a stream TSi of the main T2-MI stream.

At the following step E312, the processor 100 calculates, for each TSi, the ratio between the number of packets of the alert service and the TSi stream according to the following formula:

$$\text{ratio}(i) = \frac{\text{No\_packet}(i)}{\text{No\_packet\_alert}}.$$

It should be noted here that, since the result of this division is not an integer, the processor 200 then defines as remainder (i) the remainder of the Euclidian division $$\frac{\text{No\_packet}(i)}{\text{No\_packet\_alert}}.$$

At the following step E313, the processor 200 calculates, for each TSi stream, the duration of a TS packet in PCR hours. The timestamping, in the form of packets containing a PCR field, is described in ISO 13818-1.

PCR is the acronym for "Program Clock Reference".

For this purpose, the processor 200 uses the PID containing the PCR of the first service of the TSi stream. At each new PCR(n) value, where n is the PCR field index, the processor 200 determines: Diff=PCR(n)−PCR(n−1), counts the number of TS packets between two PCR values: N°PacketPCR(i) and performs the Euclidian division of Diff by N°PacketPCR(i). The quotient is referred to as step_per(i), the remainder as remainder_per(i).

The processor 200 carries out a Euclidian division of Diff by N°PacketPCR. The quotient is referred to as step_per(i) and the remainder remainder_per(i).

The processor 200 timestamps in PCR time all the packets of the TSi stream. The timestamping TimePcr of the packet j carried out is as follows:

TimePcr (0)=0 and residue_per=0 for the first packet containing the T2 frame mark following the reception of the alert message, namely the frame numbered 52 residue_per(j+1)=residue_per(j)+remainder_per(i), if residue_per(j+1)<N°PacketPCR then TimePcr(j)=TimePcr(j−1)+step_per(i)

Otherwise residue_per(j+1)=residue_per(j+1)−N°PacketPCR

TimePcr(j)=TimePcr(j−1)+step_per(i)+1

Figure 3C:
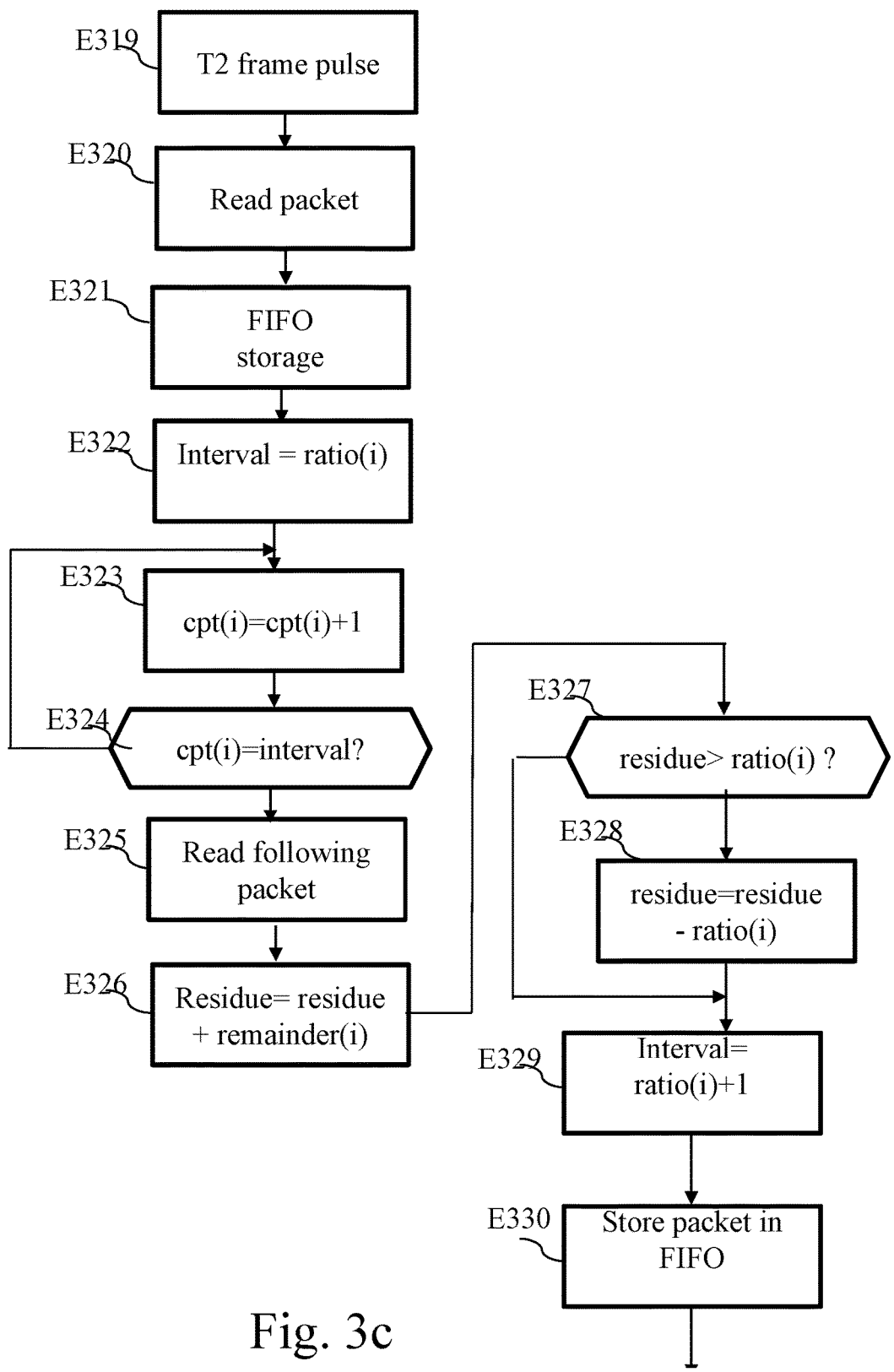
Figure 3D:
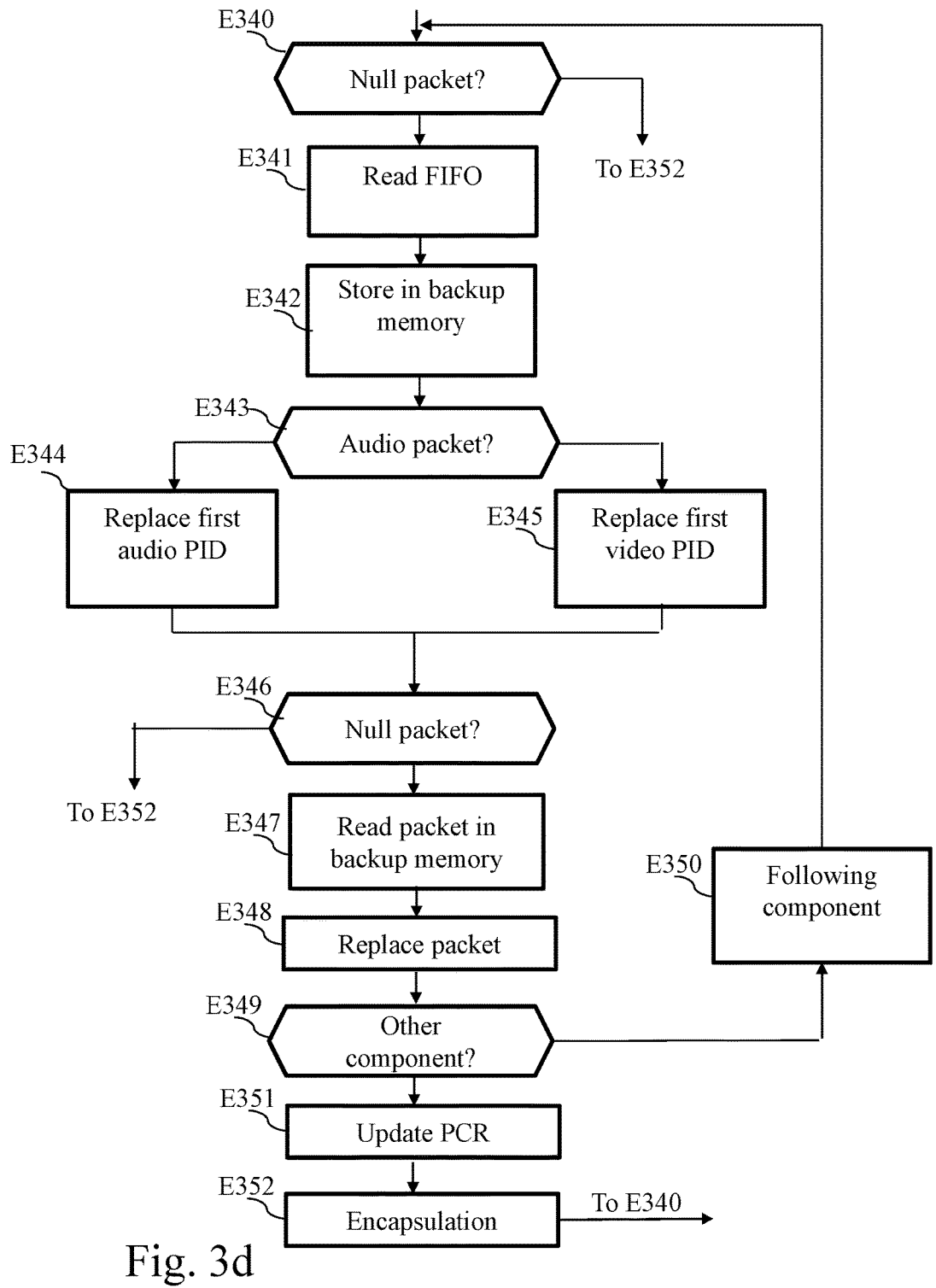

Once this operation has been performed, the processor 200 passes to step E319 in FIG. 3c.

At step E319, the processor 200 detects a T2 frame mark.

At the following step E320, the processor 200 reads the first alert service packet stored during the previous T2 frame and stores it in a FIFO memory.

At the following step E322, the processor 200 defines the following variables Interval(i)=ratio(i), residue(i) and the packet counter cpt(i)=1.

At the following step E323, the processor 200, at each packet of each TSi stream, increments the corresponding counter cpt(i) by one unit.

At the following step E324, the processor 200 checks whether the cpt(i) counter=Interval.

If so, the processor 200 passes to step E325, if not, the processor 200 returns to step E323.

At step E325, the processor 200 reads the following packet received.

At the following step E326, the processor 200 updates the variable residue(i): residue(i)=residue(i)+remainder(i).

At the following step E327, the processor 200 checks whether residue(i)>ratio (i). If not, the processor 200 passes to step E329. If so the processor 200 passes to step E328 and updates the variable residue(i): residue(i)=residue(i) ratio(i).

At the following step E329, the processor 200 updates the variable interval(i): interval(i)=ratio(i)+1.

At step E330, the processor 200 reads the following packet of the alert service stored during the previous T2 frame and stores it in a FIFO memory.

Thus all the packets of the alert service saved during the previous T2 frame are read and stored in the FIFO memory.

Once this operation is performed, the processor 200 passes to step E340 in FIG. 3c.

At the following step E340, the processor 200 checks whether the packet received from the TSi stream is a null packet and that the FIFO memory contains at least one packet of the alert service.

If not, the packet received from the TSi stream is not modified and the processor 200 passes to step E352.

If so, the processor 200 passes to step E341 and reads a packet in the FIFO memory.

At the following step E342, the processor 200 stores the packet read at step E341 in a so-called backup memory.

At the following step E343, the processor 200 checks whether the TSi packet read is a packet of an audio component. If the packet is a packet of an audio component, the processor 200 passes to step E344. The processor 200 replaces the null packet with the packet of the alert service read. If not, the processor 200 passes to step E345.

At step E344, the processor 200 replaces the PID of the alert service packet stored in the backup memory with the first PID of the audio component of the TSi stream identified at step E305.

Once this operation has been performed, the processor 200 passes to step E346.

At step E345, the processor 200 replaces the PID of the alert service packet stored in the backup memory with the first PID of the video component of the TSi stream identified at step E305.

Once this operation has been performed, the processor 200 passes to step E346.

At step E346, the processor 200 checks whether the following packet received from the TSi stream is a null packet. If the following packet of the TSi stream is a null packet, the processor 200 passes to step E347. If not, the processor 200 passes to step E352.

At step E347, the processor 200 reads the following packet stored in the so-called backup memory. The processor 200 replaces the null packet with the alert service packet read.

At the following step E348, the processor 200 replaces the PID of the alert service packet stored in the backup memory with the following PID of the audio component of the TSi stream identified at step 305 if the packet read is an audio packet or replaces the PID of the alert service stored in the backup memory with the following PID of the video component of the TSi stream identified at step E305.

At step E349, the processor 200 checks whether all the components of each TSi stream have been processed. If not, the processor 200 passes to step E350. If so, the processor 200 passes to step E351.

At step E340, the processor 200 considers another component and returns to step E346.

At step E351, the processor 200 updates the continuity counters of the packets. For each PID of the services replaced, the first continuity counter accepted is 0 and the discontinuity indicator flag (or "flag discontinuity indicator") is set to one; next, for each PID the continuity counter is incremented by 1.

At step E350 the processor 200 updates the PCRs of the streams thus modified. The PCR of the packet n is updated as follows:

PCR(n)=PCR(n−1)+DeltaT(n, n−1) where DeltaT is the time between the packet n and the packet n−1.

For each service, the first PCR value updated is the original PCR of the packet inserted and the discontinuity indicator flag is set to 1:

PCRout(0)=PCRin(0)

For n>0 PCRout(n)=PCRout(n−1)+DeltaT(n, n−1), DeltaT(n,n−1)=TimePcr(n)−TimePcr(n−1).

Once this operation has been performed, the processor 200 passes to step E352 and re-encapsulates the packets in a T2-MI stream. The T2-MI stream has exactly the same structure as the original stream since the processing is carried out at the TS level and there is no packet elimination or addition. The processing latency of the main stream is very low and thus it is easy to repeat the characteristics of the incoming T2-MI stream.

Once this operation has been performed, the processor 200 returns to step E340.

The insertion of the alert service stops either because an alert stop message is received by the alert service insertion module 10 or because the alert service is no longer present. In this case, the alert service insertion module 10 no longer performs any processing on the T2-MI stream.

The invention claimed is:

1. A method for broadcasting an alert service in a system for broadcasting digital audiovisual programmes in a single-frequency network, wherein the method comprises the steps performed by an insertion module of the alert service:

obtaining frames containing the alert service and other services, associating a mark for each frame, identifying the identifiers of the packets of audio and video components of the alert service, identifying the identifiers of the packets of audio and video components of other services, receiving a command to broadcast an alert message, storing, in a backup memory, video and audio packets of the alert service as from a first frame mark following the reception of the alert message broadcast command, and replacing, as from a second frame mark following the reception of the alert message broadcast command, all the packets of the video and audio components of the services other than the alert service with the packets of the alert service stored in the backup memory and replacing the identifiers of packets of audio and video components of the alert service respectively with the identifiers of packets of the audio or video component of the packet replaced in order to form a new frame, wherein the frames are frames of a second generation digital terrestrial television broadcasting system (DVB-T2) (type T2 frames) and the method further comprises the step of encapsulating the packets of the new frame in a synchronization modulator interface (T2-MI) stream;

wherein the T2 frames are included in audiovisual data streams (TS streams), the method further comprising the steps of:

calculating a ratio between the number of packets of video and audio components of the alert service and the number of packets of video components of the alert service and the other services, and determining a timestamping for each TS stream.

2. The method according to claim 1, wherein replacing all the packets of the video and audio components of the services other than the alert service with packets of the alert service stored in the backup memory is broken down into substeps of:

replacing, from the second frame mark following the reception of the command to broadcast an alert message, all the packets of the video and audio components of the services other than the alert service with null packets, and replacing the null packets with packets of the alert service stored in the backup memory.

3. The method according to claim 1, wherein the T2 frames comprising the alert service and the other services are included in at least one T2-MI stream and in that the T2 frames are obtained by de-encapsulating the T2 frames of the T2-MI stream.

4. The method according to claim 3, wherein the T2 frames comprising the alert service and the other services are included in a single T2-MI stream.

5. The method according to claim 3, wherein the T2 frames comprising the alert service and the other services are included in two T2-MI streams, the frames of the alert services being encapsulated in a T2-MI stream different from the T2-MI stream in which the T2 frames comprise the other services and wherein the method comprises the step of aligning the frames of the alert service and the frames of the other services.

6. The method according to claim 1, wherein the method further comprises the step of receiving a command to stop broadcasting of an alert message and wherein the packets of the other services are not replaced as from the mark of the frame following the reception of the command for stopping the broadcasting of an alert message.

7. A device for broadcasting an alert service in a system for broadcasting digital audiovisual programmes in a single-frequency network, wherein the device comprises a circuitry adapted for:
  obtaining frames containing the alert service and other services,
  associating a mark for each frame,
  identifying the identifiers of the packets of audio and video components of the alert service,
  identifying the identifiers of the packets of audio and video components of other services,
  receiving a command to broadcast an alert message,
  storing, in a backup memory, video and audio packets of the alert service as from a first frame mark following the reception of the alert message broadcast command, and
  replacing, as from a second frame mark following the reception of the alert message broadcast command, all the packets of the video and audio components of the services other than the alert service with the packets of the alert service stored in the backup memory and replacing the identifiers of packets of audio and video components of the alert service respectively with the identifiers of packets of the audio or video component of the packet replaced in order to form a new frame,
  wherein the frames are frames of a second generation digital terrestrial television broadcasting system (DVB-T2) (type T2 frames) and the circuitry is further adapted for encapsulating the packets of the new frame in a synchronization modulator interface (T2-MI) stream;
  wherein the T2 frames are included in audiovisual data streams (TS streams), and the circuitry is further adapted for:
  calculating a ratio between the number of packets of video and audio components of the alert service and the number of packets of video components of the alert service and the other services, and
  determining a timestamping for each TS stream.

* * * * *